(12) United States Patent
Ikehara et al.

(10) Patent No.: US 9,746,542 B2
(45) Date of Patent: Aug. 29, 2017

(54) LIGHTING APPARATUS AND POSITIONING SYSTEM

(71) Applicant: Panasonic Intellectual Property Management Co., Ltd., Osaka (JP)

(72) Inventors: Masaaki Ikehara, Osaka (JP); Shojirou Kido, Osaka (JP); Yosuke Kondo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/823,195

(22) Filed: Aug. 11, 2015

(65) Prior Publication Data

US 2016/0072581 A1 Mar. 10, 2016

(30) Foreign Application Priority Data

Sep. 9, 2014 (JP) ................................. 2014-183691

(51) Int. Cl.
| | |
|---|---|
| *H04B 10/116* | (2013.01) |
| *H04B 10/114* | (2013.01) |
| *G01S 1/04* | (2006.01) |
| *H04W 4/02* | (2009.01) |
| *G01S 1/70* | (2006.01) |
| *G01S 5/02* | (2010.01) |

(52) U.S. Cl.
CPC ................ *G01S 1/042* (2013.01); *G01S 1/70* (2013.01); *G01S 5/0263* (2013.01); *H04B 10/116* (2013.01); *H04B 10/1141* (2013.01); *H04W 4/02* (2013.01)

(58) Field of Classification Search
CPC ........................... H04B 10/116; H04B 10/1141
See application file for complete search history.

(56) References Cited

U.S. PATENT DOCUMENTS

| | | | | |
|---|---|---|---|---|
| 5,636,264 | A * | 6/1997 | Sulavuori | H04B 10/1143 370/273 |
| 2013/0010018 | A1* | 1/2013 | Economy | H05B 37/0272 345/691 |
| 2013/0026945 | A1* | 1/2013 | Ganick | G01S 1/70 315/246 |

(Continued)

FOREIGN PATENT DOCUMENTS

| | | |
|---|---|---|
| JP | 2006-174257 | 6/2006 |
| JP | 2007-266794 | 10/2007 |

(Continued)

*Primary Examiner* — Nathan Curs
(74) *Attorney, Agent, or Firm* — Renner Otto Boisselle & Sklar, LLP (57) ABSTRACT

A lighting apparatus that is used in a positioning system and is locatable in plural number in a limited area is provided. The lighting apparatus for use in the positioning includes a power supplier that supplies power, a lighting unit that is lit by the power supplied by the power supplier, and a beacon transmitter. The beacon transmitter operates by the power supplied by the power supplier, and transmits a beacon that is a signal for positioning. The beacon includes a long-distance beacon transmitted with first transmission power and a short-distance beacon transmitted with a second transmission power less than the first transmission power. The beacon transmitter transmits at least the long-distance beacon intermittently.

11 Claims, 10 Drawing Sheets

(56) References Cited

U.S. PATENT DOCUMENTS

| | | | | |
|---|---|---|---|---|
| 2014/0249928 A1* | 9/2014 | McMillan | ............ | G06Q 30/0267 705/14.64 |
| 2015/0029945 A1* | 1/2015 | Do | ...................... | H04W 76/02 370/329 |
| 2015/0119071 A1* | 4/2015 | Basha | .................. | H04W 64/00 455/456.1 |
| 2015/0120558 A1* | 4/2015 | Andrews | ............ | G07C 9/00571 705/44 |
| 2015/0147067 A1* | 5/2015 | Ryan | .................. | H04B 10/116 398/118 |

FOREIGN PATENT DOCUMENTS

| | | |
|---|---|---|
| JP | 2009-026056 | 2/2009 |
| JP | 2009-053118 | 3/2009 |
| JP | 2009-171516 | 7/2009 |

* cited by examiner

LIGHTING APPARATUS AND POSITIONING SYSTEM

CROSS REFERENCE TO RELATED APPLICATION

This application claims the benefit of priority of Japanese Patent Application Number 2014-183691, filed on Sep. 9, 2014, the entire content of which is hereby incorporated by reference.

BACKGROUND OF THE INVENTION

1. Field of the Invention

The present disclosure relates to a lighting apparatus and a positioning system including the lighting apparatus.

2. Description of the Related Art

A positioning system has been proposed in which a beacon carrying identification information using light or radio waves is transmitted from a lighting apparatus to specify a position of a terminal device that receives the beacon (see Japanese Unexamined Patent Application Publication No. 2009-53118, for example). The beacon is a signal containing identification information for positioning.

Bluetooth (registered trademark) low energy (BLE) has recently been considered for near-field wireless communication technology to be used for a positioning system. When the BLE is used as a radio wave beacon for the positioning, the near-field wireless communication with low power consumption contributes to accurate positioning. Here, the radio wave beacon is a beacon which carries identification information using radio waves.

SUMMARY OF THE INVENTION

In indoor positioning, a radio wave beacon on the BLE, which is a signal of 2.4 GHz, is unfortunately susceptive to influence of multipath or the like, causing accurate capture of a position to be difficult. Alternatively, an output of a radio wave beacon may be reduced. For the occasion, when a transmitter is mounted on a ceiling, i.e., a position three meters high from a floor, the radio wave beacon may not be received depending on positions, causing the positioning to be accomplished only in a limited area.

A transmitter transmitting radio wave beacons may be mounted on a guide signboard or a notice provided on a ceiling or the like. Accordingly, the guide signboard or the notice can be utilized as a source of rough position information. Here, guide signboards and notices are often located adjacent to each other, causing radio wave beacons emitted from the guide signboards and the notices to interfere with each other. This may prevent a terminal device from receiving the radio wave beacons. In particular, a radio wave beacon on the BLE can use only three bandwidths for advertisement signals, causing the interference to easily occur between radio wave beacons. This makes it difficult to locate a plurality of guide signboards transmitting radio wave beacons in limited areas, such as places where underground passages intersect and the vicinity of stations.

In view of the above, an object of the present disclosure is to provide a lighting apparatus for use in a positioning system and capable of being located in plural number in a limited area, and a positioning system including the lighting apparatus.

To achieve the aforementioned object, a lighting apparatus according to an aspect of the present invention is used in a positioning system, and includes: a power supplier that supplies power; a lighting unit that is lit by the power supplied by the power supplier; and a beacon transmitter that operates by the power supplied by the power supplier, and transmits a beacon which is a signal for positioning. The beacon includes a long-distance beacon transmitted with first transmission power and a short-distance beacon transmitted with second transmission power less than the first transmission power. The beacon transmitter transmits at least the long-distance beacon intermittently.

In addition to the above, a positioning system according to an aspect of the present invention includes: the aforementioned lighting apparatus; and a terminal device that receives a beacon transmitted from the lighting apparatus, and performs positioning using the received beacon.

According to the present disclosure, a lighting apparatus for use in a positioning system and capable of being located in plural number in a limited area, and a positioning system including the lighting apparatus are achieved.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE PREFERRED EMBODIMENT(S)

Hereinafter, specific description of embodiments of a lighting apparatus and a positioning system according to the present disclosure will be carried out with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

EMBODIMENT 1

First, a positioning system according to Embodiment 1 of the present disclosure is described.

Figure 1:
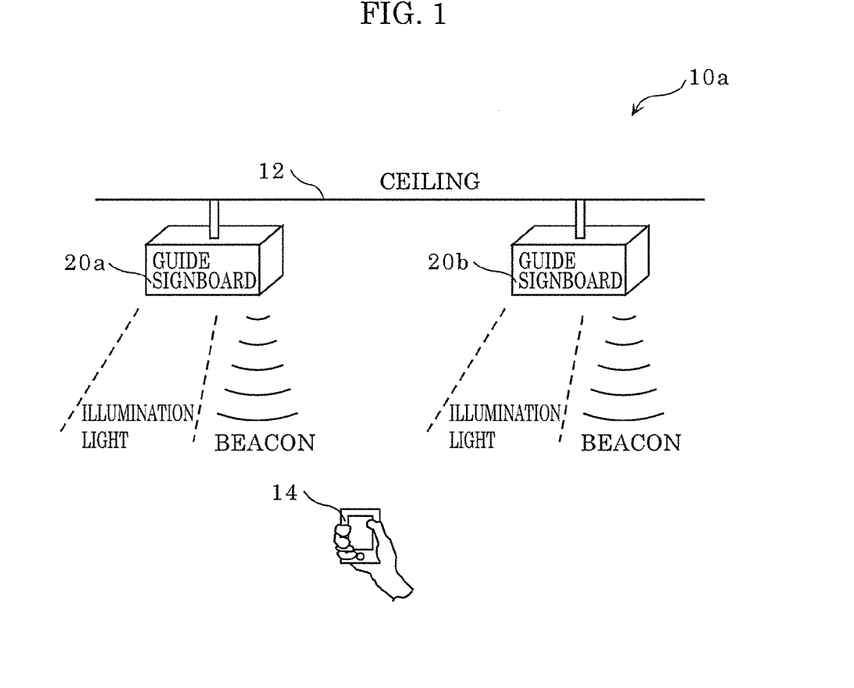
FIG. 1 is a block diagram showing a configuration of a positioning system according to Embodiment 1 of the present disclosure.

FIG. 1 is a block diagram showing positioning system 10a according to Embodiment 1 of the present disclosure. Positioning system 10a, which is used as an indoor positioning system in the present embodiment, locates a position of terminal device 14. Positioning system 10a includes a plurality of lighting apparatuses 20a and 20b and terminal device 14. Although two lighting apparatuses 20a and 20b are illustrated in the drawings with respect to the present embodiment for convenience of the description, any number of, such as one or three, lighting apparatuses may be included in positioning system 10a. This should be applied to other embodiments.

Lighting apparatuses 20a and 20b are used for a positioning system. Lighting apparatuses 20a and 20b emit illumination light and also transmit a beacon that is a signal used for positioning. The signal includes identification information associated with an apparatus from which the signal is transmitted. In the present embodiment, lighting apparatuses 20a and 20b are guide signboards which can be mounted on ceiling 12 and the like in limited places, such as places where underground passages intersect or the vicinity of stations.

Terminal device 14 receives a beacon transmitted from lighting apparatuses 20a and 20b, and locates a position of itself using the received beacon. Terminal device 14 is, for example, a smartphone or a tablet terminal, which executes an application for such positioning.

Figure 2:
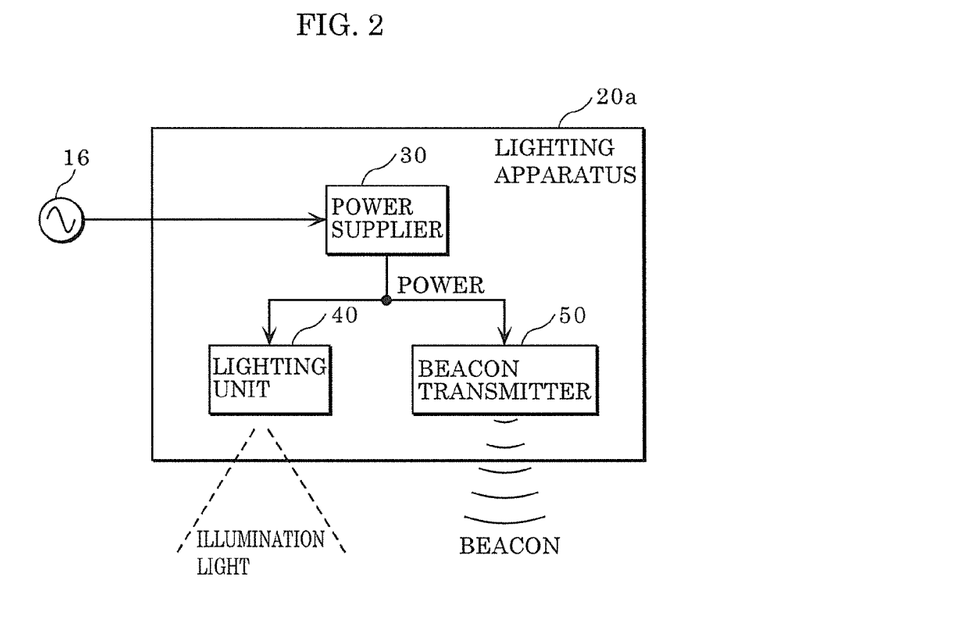
FIG. 2 is a block diagram showing a configuration of a lighting apparatus shown in FIG. 1.

FIG. 2 is a block diagram showing a configuration of lighting apparatus 20a illustrated in FIG. 1. As shown in FIG. 2, lighting apparatus 20a includes power supplier 30, lighting unit 40, and beacon transmitter 50. FIG. 2 shows a configuration of lighting apparatus 20a only, among two lighting apparatuses 20a and 20b. It should be noted that lighting apparatus 20b has the same configuration as lighting apparatus 20a has, and thus illustration in the drawings and description in the specification are omitted regarding the configuration of lighting apparatus 20b.

Power supplier 30 is a circuit for supplying electric power. For example, power supplier 30 is a power-supply circuit 4 which converts, to direct-current (DC) power, alternating-current (AC) power from AC power source 16 including a commercial power source.

Lighting unit 40 is a light source lit by power supplied from power supplier 30. Lighting unit 40 is, in other words, a light source that emits illumination light, and thus serves as a light emitting diode (LED) light source, for example.

Beacon transmitter 50 operates by the power supplied from power supplier 30. Beacon transmitter 50 is a communication circuit that transmits beacons, and thus serves as a transmitter of radio wave beacons on BLE, for example. The beacon transmitted from beacon transmitter 50 includes long-distance beacons transmitted with first transmission power and short-distance beacons transmitted with second transmission power less than the first transmission power. Beacon transmitter 50 transmits at least the long-distance beacon intermittently. It should be noted that the simple description of "beacon" indicates a collective beacon which is not categorized in the long-distance beacon or the short-distance beacon.

The long-distance beacon and the short-distance beacon may include identification information different from each other, or may include the same identification information. The identification information is used for positioning and is associated with an apparatus, i.e., lighting apparatus 20a, from which the identification information is transmitted. Terminal device 14 that receives such identification information collates the received identification information with data in a table held therein, or inquires of a server for the positioning through the Internet, to thus specify a position of terminal device 14 itself corresponding to the received identification information.

An operation of positioning system 10a according to the present embodiment, which is configured as mentioned above, is described. Distinctive lighting apparatuses 20a and 20b in positioning system 10a are now described.

Figure 3:
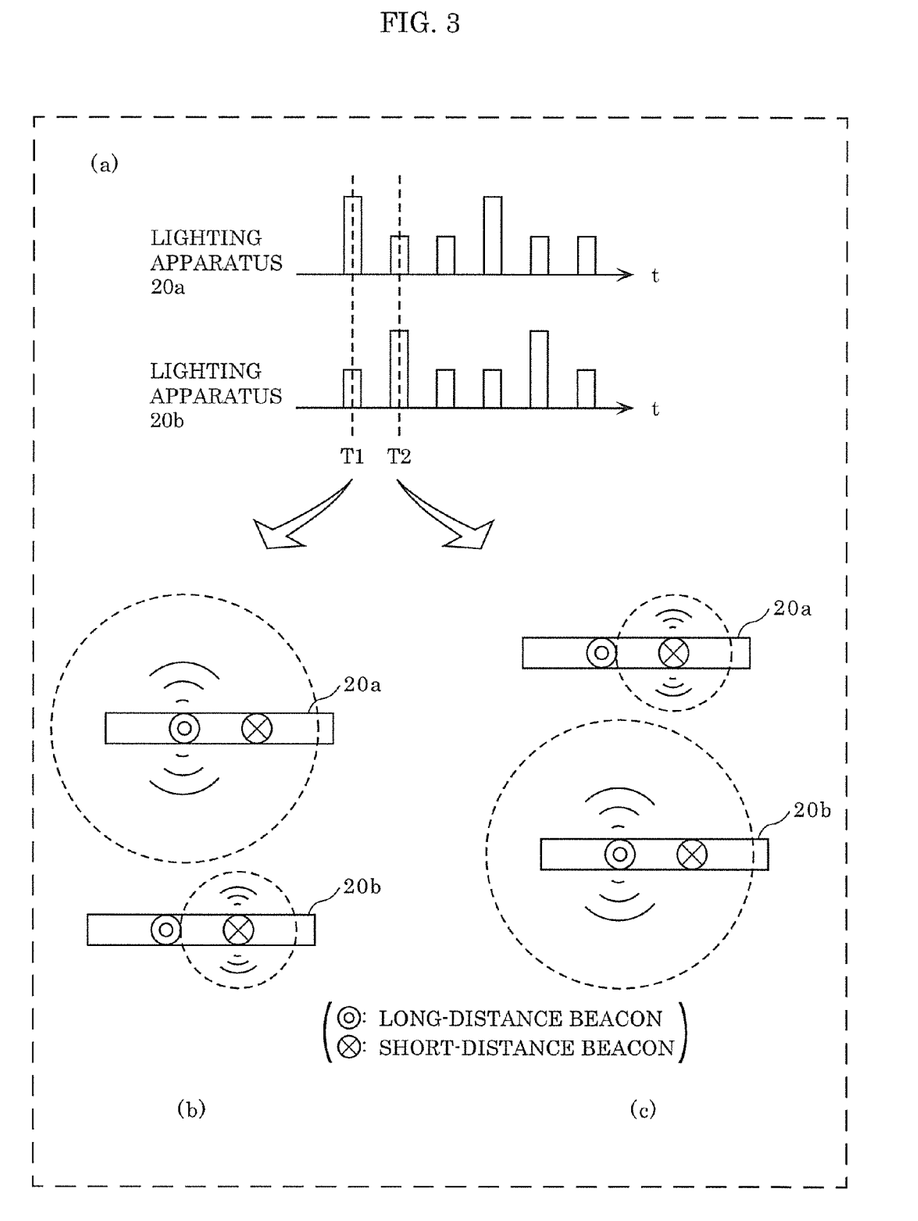
FIG. 3 is a diagram showing an operation of the positioning system according to Embodiment 1 of the present disclosure.

FIG. 3 shows the operation of positioning system 10a according to the present embodiment. FIG. 3 includes (a) that is a timing chart showing timings of transmitting the long-distance beacon and the short-distance beacon, from respective lighting apparatuses 20a and 20b. In (a), the vertical axis indicates a field intensity, i.e., transmission power. A rectangular pulse having high wave-height indicates a timing of transmitting the long-distance beacon, whereas a rectangular pulse having low wave-height indicates a timing of transmitting the short-distance beacon. Each of the pulses corresponds to a timing of transmitting the identification information. FIG. 3 includes (b) that shows a beacon transmittable range, i.e., a range to which a beacon is reachable, at time T1 in (a) of FIG. 3. FIG. 3 includes (c) that shows a beacon transmittable range at time T2 in (a) of FIG. 3. In both (b) and (c) of FIG. 3, a circle having a large radius indicates a range in which the long-distance beacon is reachable or receivable, whereas a circle having a small radius indicates a range in which the short-distance beacon is reachable to or receivable.

Lighting apparatuses 20a and 20b are located in such a proximity level that: (i) when one of lighting apparatuses 20a and 20b transmits the short-distance beacon and the other transmits the long-distance beacon, the beacons do not interfere with each other; and (ii) when both lighting apparatuses 20a and 20b transmit the long-distance beacon, the beacons interfere with each other.

As shown in (a) of FIG. 3, beacon transmitter 50 in each of lighting apparatuses 20a and 20b transmits the long-distance beacon and the short-distance beacon in a time-sharing manner, an intermittent manner, and a repeat manner. In the present embodiment, lighting apparatuses 20a and 20b repeat beacon-transmission in such a manner as to transmit the long-distance beacon once, and subsequently transmit the short-distance beacon twice. Lighting apparatuses 20a and 20b thus transmit the long-distance beacon and the short-distance beacon and also transmit the long-distance beacon intermittently, thereby reducing a probability of interference among beacons, and increasing a receiving probability of beacons by terminal device 14.

What is more distinctive is following. When one of lighting apparatuses 20a and 20b outputs the long-distance beacon, the other outputs the short-distance beacon. Specifically, at time T1 in (a) of FIG. 3, lighting apparatus 20a transmits the long-distance beacon, whereas lighting apparatus 20b transmits the short-distance beacon. Accordingly, the beacons do not interfere with each other between lighting apparatus 20a and lighting apparatus 20b at Time T1, as shown in (b) of FIG. 3. At Time T2 in (a) of FIG. 3, lighting apparatus 20a transmits the short-distance beacon, whereas lighting apparatus 20b transmits the long-distance beacon. Accordingly, the beacons do not interfere with each other between lighting apparatus 20a and lighting apparatus 20b at Time T2, as shown in (c) of FIG. 3.

The beacons naturally do not interfere with each other at a timing when neither lighting apparatus 20a nor lighting apparatus 20b transmits the long-distance beacon. Such a timing is fallen in a time period that both lighting apparatuses 20a and 20b transmit the short-distance beacons, for example.

As mentioned above, in the present embodiment, beacon transmitter 50 of each of lighting apparatuses 20a and 20b transmits the long-distance beacons in synchronization with timings at which another lighting apparatus used in positioning system 10a transmits the long-distance beacons. Specifically, beacon transmitter 50 transmits the long-distance beacons from an apparatus on which transmitter 50 is mounted at timings that do not overlap timings at which another lighting apparatus transmits the long-distance beacons. Such control can be achieved in such a manner that beacon transmitter 50 of each of lighting apparatuses 20a and 20b transmits beacons in synchronization with predetermined phases in commonly-used AC power source 16, such as a commercial power source. The phases are individually allocated to respective lighting apparatuses 20a and 20b, and are different from each other. The control can also be achieved in an alternative manner that lighting apparatuses 20a and 20b receive a common synchronization signal, and beacon transmitters 50 of lighting apparatuses 20a and 20b transmit beacons at predetermined timings different from each other. In other words, each of beacon transmitters 50 transmits beacons in turn. This surely avoid the interference between the long-distance beacons transmitted from lighting apparatuses 20a and 20b, thereby allowing a plurality of lighting apparatuses to be located in close to each other in the limited area.

According to the present embodiment, each of lighting apparatuses 20a and 20b used in positioning system 10a includes power supplier 30 that supplies power, lighting unit 40 that is lit by the power supplied by power supplier 30, and beacon transmitter 50. Beacon transmitter 50 operates by the power supplied from power supplier 30, and transmits the beacon which is a signal used for positioning. For the occasion, the beacon includes the long-distance beacon transmitted with the first transmission power and the short-distance beacon transmitted with the second transmission power smaller than the first transmission power. Beacon transmitter 50 transmits at least the long-distance beacon intermittently.

The above enables lighting apparatuses 20a and 20b to transmit the long-distance beacon and the short-distance beacon and also to transmit the long-distance beacon intermittently, thereby reducing the probability of interference among beacons and increasing the probability of beacons to be received by terminal device 14. This achieves a lighting apparatus that is used for positioning and can be located in plural number in a limited area, and a positioning system that includes the lighting apparatus.

Beacon transmitter 50 transmits long-distance beacons and short-distance beacons using radio waves. This achieves the positioning that employs a near field wireless communication contributing to low power consumption by means of the BLE.

Beacon transmitter 50 transmits long-distance beacons from the apparatus on which beacon transmitter 50 is mounted, in synchronization with timings at which another lighting apparatus in positioning system 10a transmits long-distance beacons. Specifically, beacon transmitter 50 transmits a long-distance beacon from the apparatus on which beacon transmitter 50 is mounted at a timing which does not overlap timings at which another lighting apparatus transmits long-distance beacons.

This surely avoids the long-distance beacons transmitted by respective lighting apparatuses 20a and 20b from interfering with each other. Accordingly, a plurality of lighting apparatuses can be located in close to each other in a limited area.

Although lighting apparatuses 20a and 20b transmit the long-distance beacons in synchronization with each other in the aforementioned embodiment, the synchronization is not essential. Respective lighting apparatuses 20a and 20b transmit the long-distance beacons intermittently, allowing the probability of the interference occurring in beacons to be lower than that in constant transmission of the long-distance beacons, even without the synchronization. In this regard, when lighting apparatuses 20a and 20b transmit beacons without synchronization, intervals of transmission of the long-distance beacons from lighting apparatuses 20a and 20b may be individually set longer than those in transmission with synchronization.

Beacon transmitter 50 may transmit optical signals using visible light, ultraviolet light, or infrared light when transmitting the short-distance beacons in the aforementioned embodiment. The optical signals include, for example, an optical signal for a visible light communication, which is obtained by modulating an intensity of light to be emitted from lighting unit 40. When transmitting the optical signals, beacon transmitter 50 may transmit, in parallel with short-distance beacons using radio waves, an optical signal including identification information same as or different from identification information included in the short-distance beacons, or may transmit an optical signal instead of the short-distance beacons using the radio waves. This enables the positioning system that supports terminal device 14 capable of receiving the optical signals.

Figure 4:
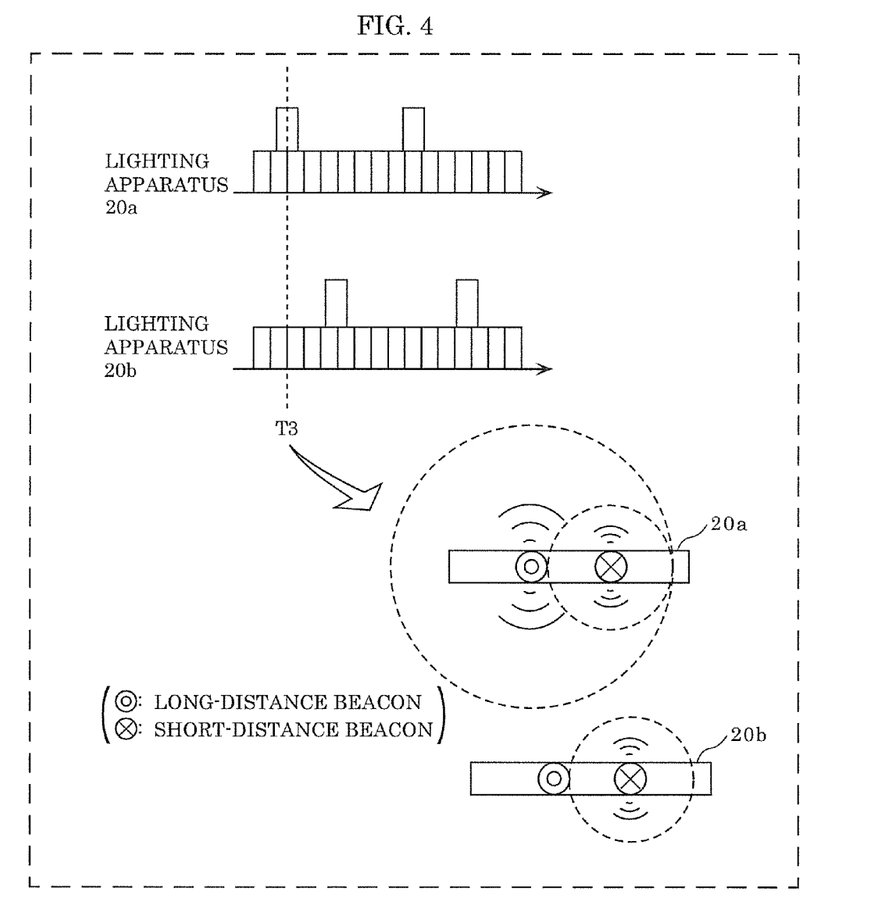
FIG. 4 is a diagram showing a timing of transmitting a beacon according to a modification of Embodiment 1 of the present disclosure.

Although the long-distance beacon and the short-distance beacon are transmitted in the time sharing manner in the aforementioned embodiment, they may be simultaneously transmitted as shown in FIG. 4. FIG. 4 is a diagram showing timings of transmitting beacons according to a modification of the aforementioned embodiment. As shown in FIG. 4, lighting apparatuses 20a and 20b transmit the short-distance beacon in a continuous manner at the illustrated transmission timings. Accordingly, the short-distance beacons are transmitted simultaneously with the timings at which the long-distance beacons are transmitted.

Even in such transmission timings according to the modification, the long-distance beacons are intermittently transmitted. This reduces the probability of interference occurring in beacons from lighting apparatuses 20a and 20b. When lighting apparatuses 20a and 20b transmit the long-distance beacons in synchronization with each other so as to transmit the long-distance beacons at timings exclusive from each other, two long-distance beacons never interfere with each other.

EMBODIMENT 2

A positioning system according to Embodiment 2 of the present disclosure will now be described.

Figure 5:
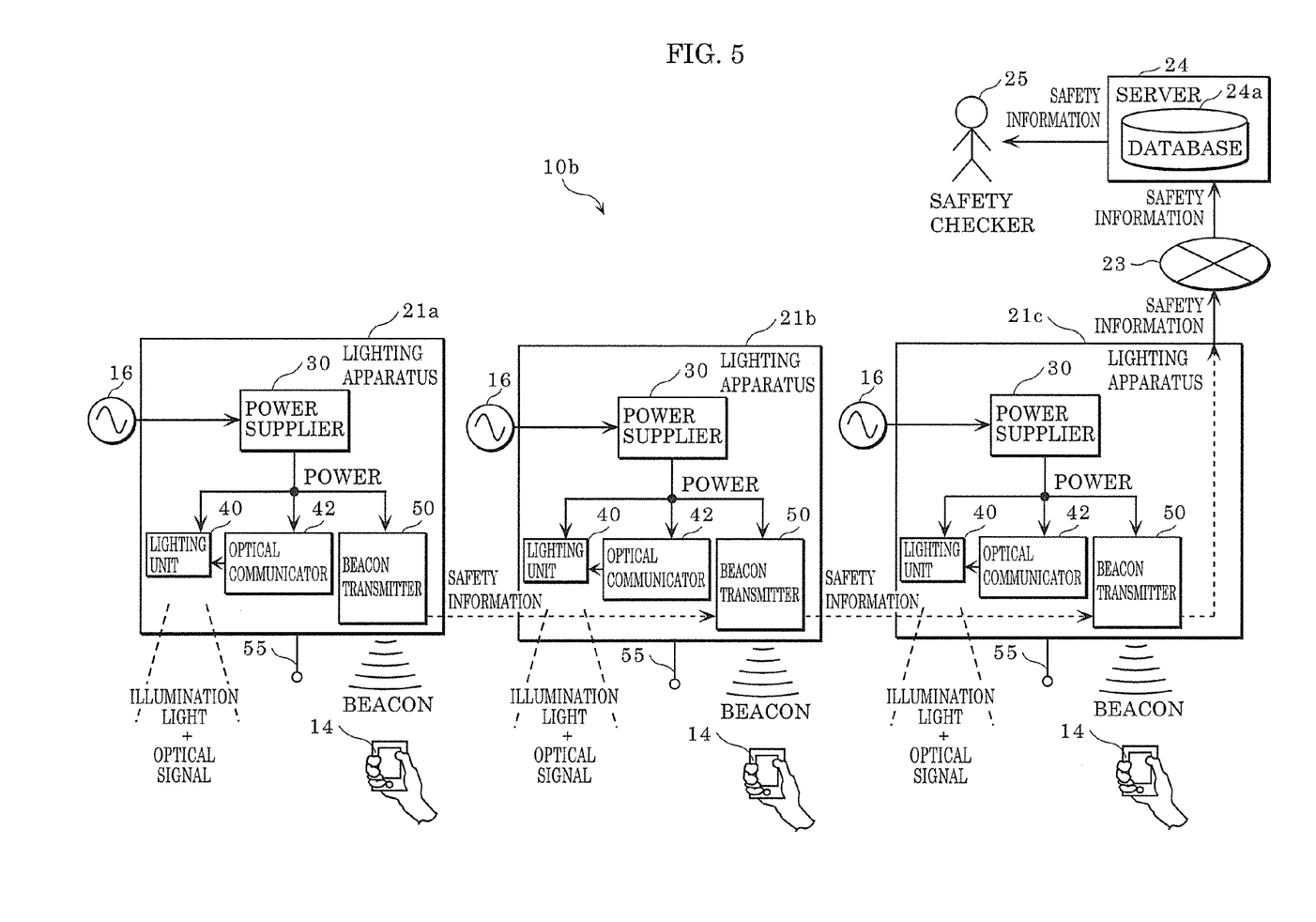
FIG. 5 is a block diagram showing a configuration of a positioning system according to Embodiment 2 of the present disclosure.

FIG. 5 is a block diagram showing a configuration of positioning system 10b according to Embodiment 2 of the present disclosure. Positioning system 10b is capable of positioning terminal device 14, and is also capable of conducting safety check at emergency. Positioning system 10b includes a plurality of lighting apparatuses 21a to 21c and terminal device 14. In the present embodiment, the emergency indicates a state that AC power is cut to be supplied from AC power source 16 to lighting apparatuses 21a to 21c.

Figure 6:
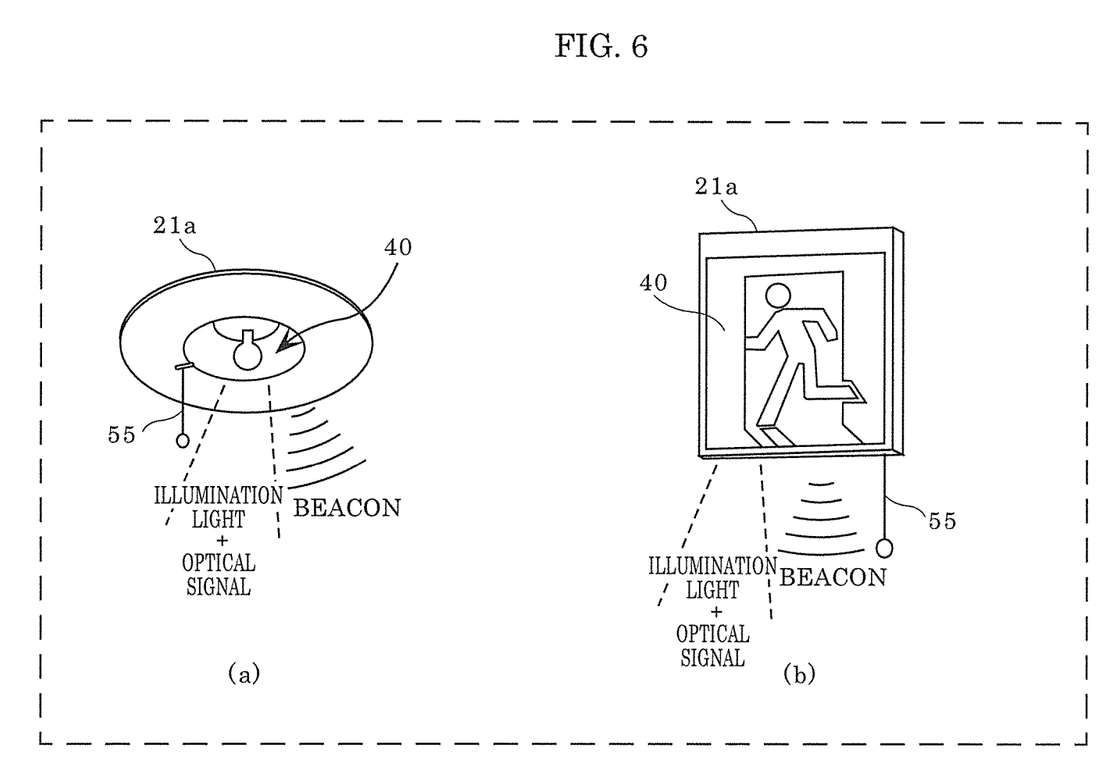
FIG. 6 is a diagram showing appearance examples of a lighting apparatus illustrated in FIG. 5.

Lighting apparatuses 21a to 21c are a lighting apparatus that is used in the positioning system, and serves as an emergency light or a guide light in the present embodiment. Lighting apparatuses 21a to 21c have at least functions included in lighting apparatuses 20a and 20b in Embodiment 1. Lighting apparatuses 21a to 21c according to the present embodiment are lighting apparatuses shown in appearance views (a) and (b) of FIG. 6, and include power supplier 30, lighting unit 40, optical communicator 42, beacon transmitter 50, and inspection string 55, as shown in FIG. 5. Hereinafter the description is carried out in focus on functions added to those in Embodiment 1 and functions different from those in Embodiment 1.

Power supplier 30 converts the AC power from AC power source 16 to DC power, and includes therein storage battery 32. At emergency, power supplier 30 detects that the AC power is cut to be supplied from AC power source 16, and then notifies lighting unit 40, optical communicator 42, and beacon transmitter 50 that (i) the DC power is supplied from internal storage battery 32, and (ii) the state is emergency.

Inspection string 55 is an example of input devices for detecting an instruction, i.e., a maintenance instruction, from the outside. Inspection string 55 may be pulled. Such information, i.e., inspection string 55 is pulled, is notified to lighting unit 40, optical communicator 42, and beacon transmitter 50.

Lighting unit 40 is a light source lit by power supplied from power supplier 30. According to the present embodiment, lighting unit 40 functions as an illumination light source or is extinguished at normal time, i.e., not the emergency time, whereas lighting unit 40 functions as the emergency light or the guide light lit by power supplied from storage battery 32 included in power supplier 30 at the emergency. At maintenance, lighting unit 40 operates in the same manner as at the emergency. The maintenance is instructed and notified by inspection string 55 being pulled. Optical communicator 42 is a circuit that transmits an optical signal by modulating light to be emitted from lighting unit 40. At the emergency, optical communicator 42 operates by the power supplied from storage battery 32 included in power supplier 30. At the normal time, optical communicator 42 transmits, using an optical signal, predetermined information, such as bargain information in a shopping district. Alternatively, optical communicator 42 stops the operation when lighting unit 40 is extinguished. In contrast, at the emergency, optical communicator 42 transmits an emergency message using an optical signal by the power supplied from storage battery 32. At the maintenance, optical communicator 42 transmits maintenance information using an optical signal. The maintenance information is necessary information for maintenance of the lighting apparatus, and indicates at least one of a lighting state of lighting unit 40, a charging level of storage battery 32, and a state of beacon transmitter 50. Such maintenance information is received by and displayed on terminal device 14 capable of receiving optical signals.

In the present embodiment, lighting unit 40 serves as a light source at the normal time and at the emergency. At the emergency, lighting unit 40 serves as an emergency light or a guide light. In addition, lighting unit 40 also serves as a transmitter transmitting optical signals. In place of lighting unit 40 or in addition to lighting unit 40, optical communicator 42 may function as the light source at the normal time and as the transmitter of the optical signal.

Beacon transmitter 50 includes similar functions as beacon transmitter 50 in Embodiment 1, and also includes safety check function operated by the power supplied from storage battery 32 included in power supplier 30, at the emergency. Specifically, beacon transmitter 50 obtains, from terminal device 14, information held by terminal device 14 as safety information to check safety of a person carrying terminal device 14, at the emergency. The information held by terminal device 14 includes identification information such as a communication address of terminal device 14, for example. Beacon transmitter 50 then transfers the obtained safety information to another beacon transmitter 50 included in another lighting apparatus in the positioning system, through an ad-hoc communication. In the present embodiment, beacon transmitter 50 in lighting apparatus 21a transfers the obtained safety information to beacon transmitter 50 in lighting apparatus 21b. Similarly, beacon transmitter 50 in lighting apparatus 21b transfers the safety information obtained from lighting apparatus 21a and terminal device 14 to beacon transmitter 50 of lighting apparatus 21c. Beacon transmitter 50 in lighting apparatus 21c that is at the downmost stream in the ad-hoc communication notifies server 24 of the safety information through internet 23. At the maintenance, beacon transmitter 50 operates in a similar manner as at the emergency.

When receiving the safety information from lighting apparatus 21c through internet 23, server 24 refers to database 24c that indicates correspondence between the identification information contained in the safety information and an address of safety-check person 25, to thereby specify the address of safety-check person 25 that corresponds to the received safety information. Server 24 then notifies the specified address that the safety information has been obtained. Accordingly, the safety of a person carrying terminal device 14 is available to safety-check person 25 at the emergency.

Operation of positioning system 10b according to the present embodiment, which is configured as mentioned above, will now be described.

Figure 7:
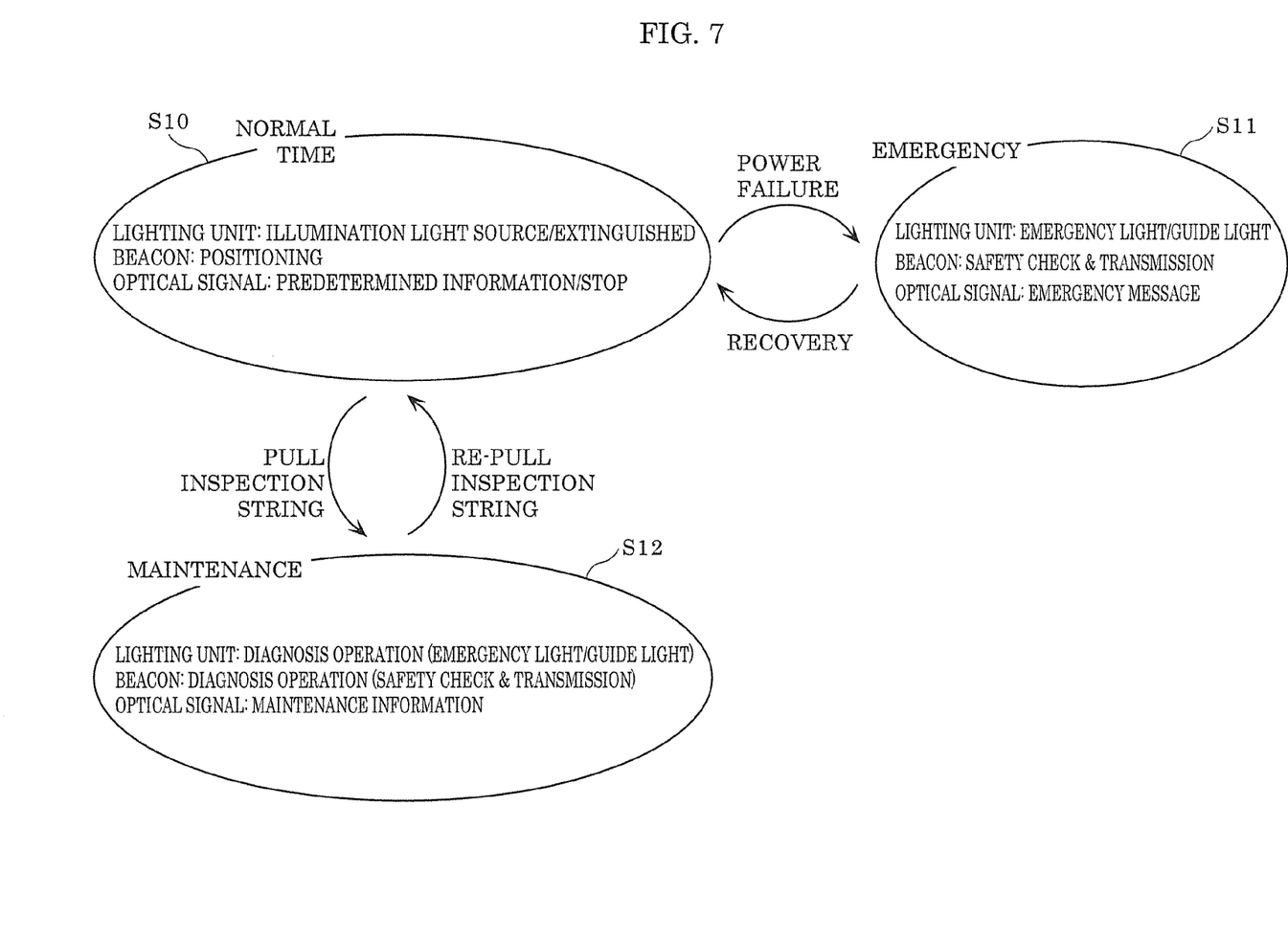
FIG. 7 is a state transition diagram showing an operation of the positioning system according to Embodiment 2 of the present disclosure.

FIG. 7 is a state transition diagram showing operation of positioning system 10b according to the present embodiment. The state transition diagram shows operation modes of distinctive lighting apparatuses 21a to 21c in positioning system 10b.

1. At Normal Time (S10)

Lighting apparatuses 21a to 21c operates in a manner below at the normal time at which AC power is supplied from AC power source 16.

Lighting unit 40 receives DC power prepared by converting, in power supplier 30, the AC power from AC power source 16, so as to function as an illumination light source or is extinguished at the normal time in the similar manner as in Embodiment 1. Beacon transmitter 50 receives the DC power prepared by converting, in power supplier 30, the AC power from AC power source 16, so as to transmit beacons for the positioning, such as long-distance beacons and short-distance beacons, in the similar manner as in Embodiment 1. Optical communicator 42 receives the DC power prepared by converting, in power supplier 30, the AC power from AC power source 16, so as to transmit predetermined information, such as bargain information in a shopping district.

2. At Emergency (S11)

Lighting apparatuses 21a to 21c operate in a manner below at the emergency at which no AC power is supplied from AC power source 16. As aforementioned, upon detecting that the AC power is cut off from AC power source 16 at the emergency, power supplier 30 notifies lighting unit 40, optical communicator 42, and beacon transmitter 50 that (i) the DC power is supplied from internal storage battery 32, and (ii) the state is emergency.

At the emergency, upon receiving notification of the emergency from power supplier 30, lighting unit 40 serves as an emergency light or a guide light using the DC power from storage battery 32 included in power supplier 30. Upon receiving the notification of the emergency from power supplier 30, beacon transmitter 50 performs safety check processing using DC power from storage battery 32 included in power supplier 30. Here, the safety check processing is such that the safety information is collected from terminal device 14 and the safety information is transferred, as mentioned above. Upon receiving the notification of the emergency from power supplier 30, optical communicator 42 transmits an emergency message using the DC power from storage battery 32 included in power supplier 30. Here, the emergency message indicates the power failure and escape route information, for example.

When the power failure is recovered and AC power supplier 16 restarts supplying the AC power, lighting apparatuses 21a to 21c operate in a normal time operation mode (S10).

3. At Maintenance (S12)

A maintenance instruction is provided by pulling inspection string 55, causing lighting apparatuses 21a to 21c to operate in a manner below.

Upon receiving the notification of the maintenance instruction, lighting unit 40 operates for diagnosis, in a similar manner as at the emergency. Lighting unit 40 functions as an emergency light or a guide light lit by the power supplied from storage battery 32 included in power supplier 30, for example. Beacon transmitter 50 also operates for diagnosis, in a similar manner as at the emergency, upon receiving the notification of the maintenance instruction. Specifically, beacon transmitter 50 performs safety check processing, upon receiving DC power from storage battery 32 included in power supplier 30. Optical communicator 42 transmits maintenance information, upon receiving the notification of the maintenance instruction.

Inspection string 55 may again be pulled. When such information is notified to lighting unit 40, optical communicator 42, and beacon transmitter 50, they operate as in the normal time (S10). In short, lighting apparatuses 21a to 21c operate in the normal time operation mode (S10).

As mentioned above, lighting apparatuses 21a to 21c in positioning system 10b according to the present embodiment include following functions in addition to the functions of Embodiment 1. Power supplier 30 includes storage battery 32. Lighting unit 40 functions as an emergency light or a guide light which are lit by the power supplied from storage battery 32. Beacon transmitter 50 obtains, from terminal device 14, information held by terminal device 14 as safety information to check the safety of a person carrying terminal device 14. Beacon transmitter 50 then transmits the obtained safety information to beacon transmitter 50 included in another lighting apparatus in positioning system 10b.

Accordingly, lighting apparatus 21a to 21c are lit as the emergency light or the guide light at the emergency, such as power failure. In addition to the above, lighting apparatuses 21a to 21c are used to collect information, as the safety information, of a person present or information of terminal device 14 carried by the person, so as to notify safety-check person 25 of the information.

In Embodiment 2, optical communicator 42 is added to structural components of Embodiment 1. Optical communicator 42 transmits an optical signal by modulating light to be emitted from lighting unit 40. When detecting the maintenance instruction from the outside, optical communicator 42 transmits, using the optical signal, the maintenance information indicating at least one of a lighting state of lighting unit 40, a charging level of storage battery 32, and a state of beacon transmitter 50.

Accordingly, inspection string 55 is simply pulled at the maintenance, allowing the detailed maintenance information of lighting apparatuses 21a to 21c to be easily obtained using terminal device 14 capable of receiving the optical signal. Therefore, the maintenance of lighting apparatuses 21a to 21c are conducted more quickly and precisely than that conducted by visual operation.

EMBODIMENT 3

A lighting apparatus according to Embodiment 3 of the present disclosure will now be described.

Figure 8:
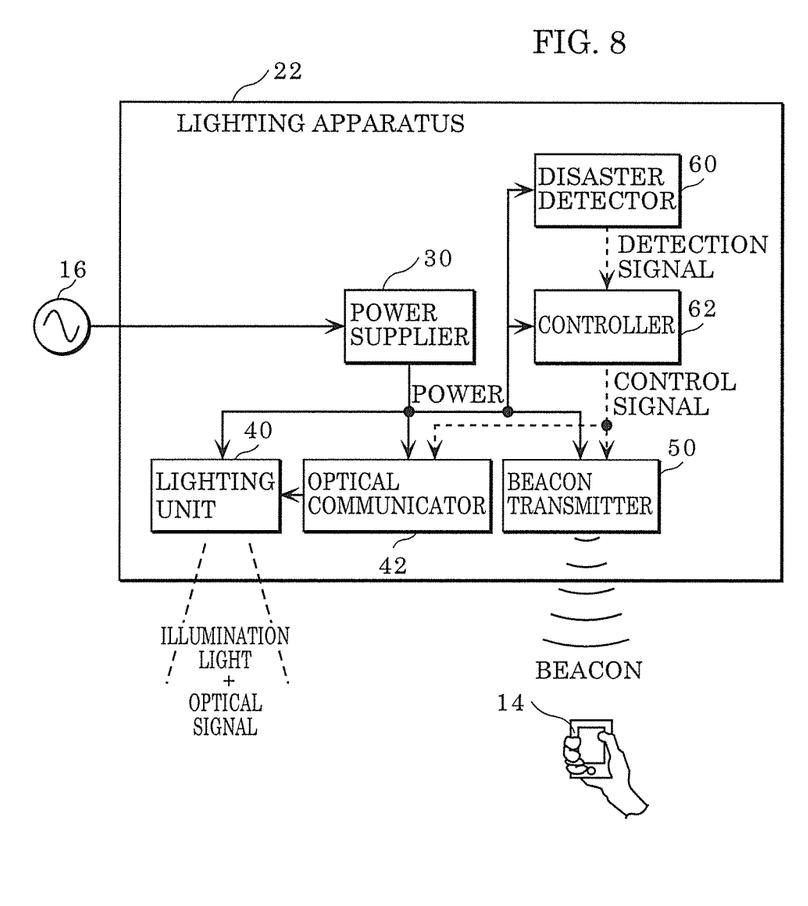
FIG. 8 is a block diagram showing a configuration of a lighting apparatus according to Embodiment 3 of the present disclosure.

FIG. 8 is a block diagram showing a configuration of lighting apparatus 22 according to Embodiment 3 of the present disclosure. Lighting apparatus 22 is used in the positioning system according to Embodiment 1 or 2 as well, and includes a function in an operation mode corresponding to a disaster, in addition to the functions included in lighting apparatuses 20a and 20b according to Embodiment 1. Specifically, lighting apparatus 22 according to the present embodiment includes power supplier 30, lighting unit 40, optical communicator 42, beacon transmitter 50, disaster detector 60, and controller 62, as shown in FIG. 8. Hereinafter, descriptions are carried out with focusing on functions added to those in Embodiment 1 and points different from those in Embodiment 1.

Power supplier 30 is a circuit similar as that in Embodiment 1, and supplies power to lighting unit 40, optical communicator 42, beacon transmitter 50, disaster detector 60, and controller 62 in the present embodiment.

Lighting unit 40 is a light source similar as that in Embodiment 1, and outputs normal illumination light and an optical signal that has undergone light-intensity modulation based on a modulation signal from optical communicator 42.

Optical transmitter 42 is a circuit that transmits an optical signal by modulating the light to be emitted by lighting unit 40.

Beacon transmitter 50 includes functions similar as those of beacon transmitter 50 according to Embodiment 1. Here, beacon transmitter 50 in the present embodiment transmits a radio wave beacon, i.e., a beacon using a radio wave such as BLE.

Disaster detector 60 is a circuit that operates by the power supplied from power supplier 30, to detect occurrence of a disaster. Disaster detector 60 obtains disaster information using a radio wave in wireless fidelity (Wi-Fi that is registered trademark), or a third generation cellular phone (3G), for example, and serves as a communication circuit that outputs the obtained disaster information to a controller as a detection signal.

Controller 62 is a circuit that operates by the power supplied from power supplier 30 to control optical communicator 42 and beacon transmitter 50 in an operation mode according to the detection in disaster detector 60. The operation mode includes a normal mode and a disaster mode. Controller 62 is achieved by a one-chip microcomputer having therein a control program, for example.

Specifically, when disaster detector 60 detects no disaster, controller 62 causes optical communicator 42 and beacon transmitter 50 to operate in an operation mode that is previously determined as a normal mode. When disaster detector 60 detects a disaster, on the other hand, controller 62 causes optical communicator 42 and beacon transmitter 50 to operate in an operation mode that is previously determined as a disaster mode.

In the disaster mode, controller 62 controls beacon transmitter 50 in the following manner. Specifically, controller 62 causes beacon transmitter 50 to include, in a radio wave beacon, identification information corresponding to the disaster, and to perform a push communication to terminal device 14 located within reach of the radio wave beacon. The identification information corresponding to the disaster is, for example, identification information for allowing terminal device 14 to display a message that urges relocation of terminal device 14 to a place where terminal device 14 can obtain an optical signal from optical communicator 42.

In the disaster mode, controller 62 controls optical communicator 42 in the following manner. Controller 62 causes optical communicator 42 to include, in an optical signal, identification information corresponding to a type of disasters detected by disaster detector 60, and to transmit the identification information to terminal device 14. For example, controller 62 causes optical communicator 42 to include, in the optical signal, the identification information that allows terminal device 14 to display a manual for coping with a disaster, and to transmit the optical signal to terminal device 14.

Operation of lighting apparatus 22 according to the present embodiment, which is configured as above, is described below.

Figure 9:
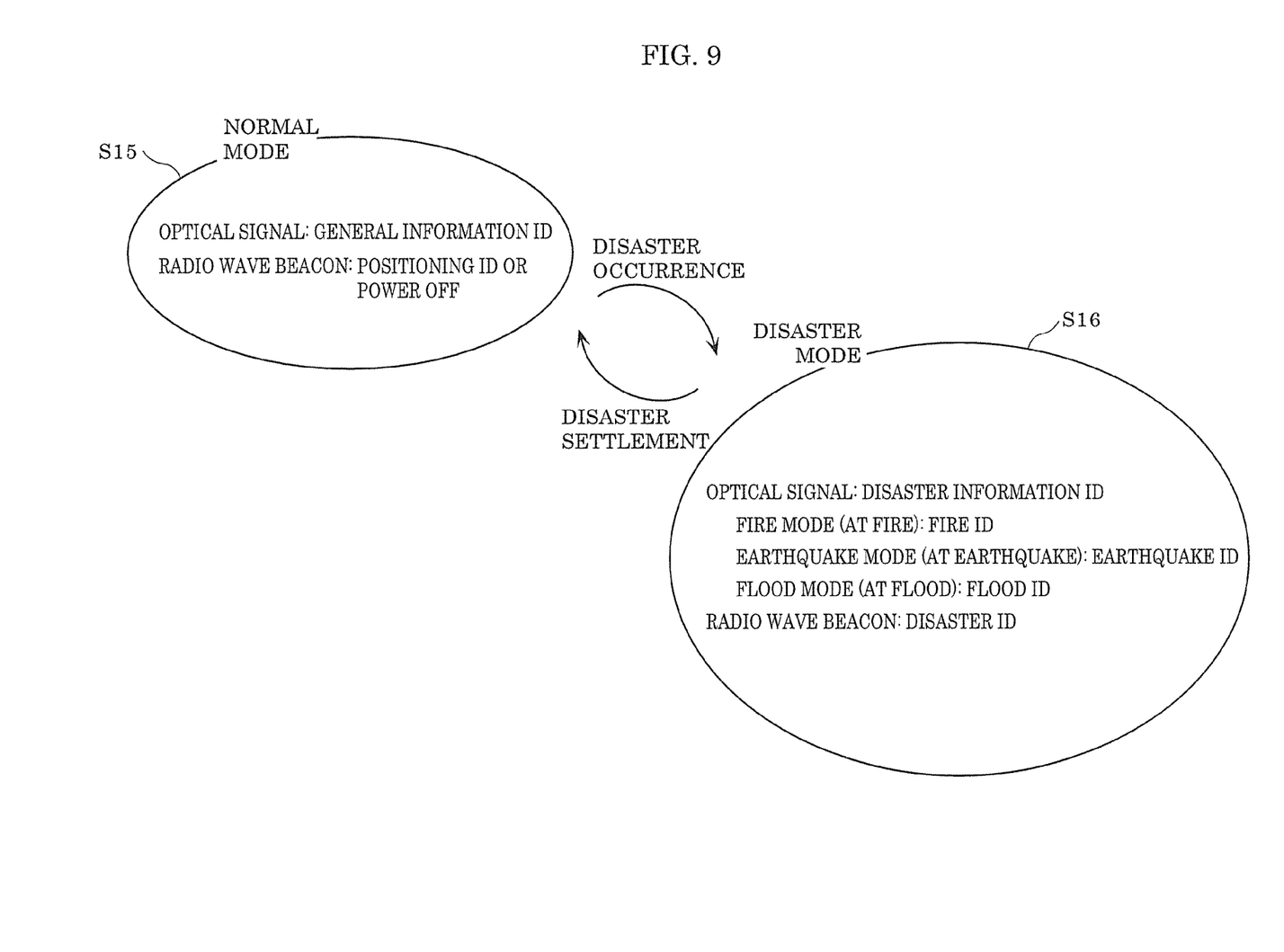
FIG. 9 is a state transition diagram showing an operation mode of the lighting apparatus according to Embodiment 3 of the present disclosure.

FIG. 9 is a state transition diagram showing operation modes of lighting apparatus 22 according to the present embodiment.

1. Normal Mode (S15)

When no disaster is detected in disaster detector 60, controller 62 performs following control.

Controller 62 causes optical communicator 42 to transmit a general information identification (ID) as an optical signal. The general information ID is identification information previously determined to be transmitted in a normal mode. Terminal device 14 that has received the identification information operates in response to the received identification information, in accordance with execution of an application. For example, terminal device 14 displays bargain information in a shopping district.

Controller 62 causes beacon transmitter 50 to transmit, as a radio wave beacon, an ID for positioning that is identification information necessary for positioning. Terminal device 14 that has received the identification information refers to a table contained therein, in accordance with the execution of the application, or sends inquiries to a positioning server via the Internet, so as to obtain and display a current position corresponding to the received identification information.

In the normal mode, the operation of at least one of optical communicator 42 and beacon transmitter 50 may stop, or may be in a state where no power is supplied, i.e., in a power OFF state.

2. Disaster Mode (S16)

When a disaster is detected by disaster detector 60, controller 62 performs following control.

Controller 62 causes optical communicator 42 to transmit an optical signal containing identification information corresponding to a type of disasters detected by disaster detector 60. The identification information is, for example, an ID for the disaster information. Terminal device 14 that has received the identification information operates in response to the received identification information, in accordance with execution of an application. For example, terminal device 14 displays a fact of the occurrence of the disaster and a type of the disaster that has occurred.

Controller 62 causes beacon transmitter 50 to transmit a radio wave beacon containing identification information corresponding to the disaster, i.e., an ID for a disaster. Terminal device 14 that has received the identification information displays thereon a message that urges relocation of terminal device 14 to a place where terminal device 14 can obtain the optical signal from optical communicator 42.

Figure 10:
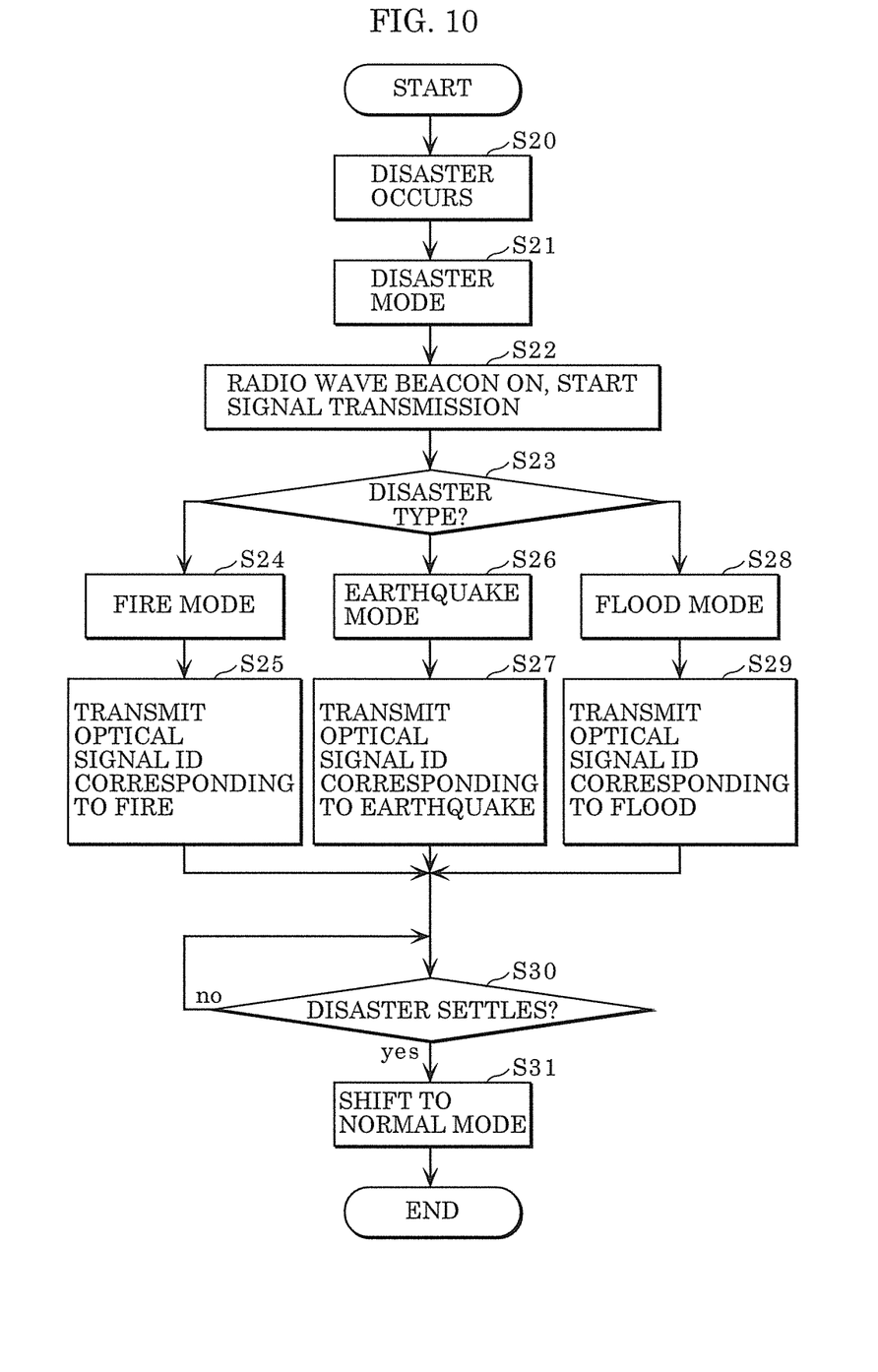
FIG. 10 is a flowchart showing an operation of the lighting apparatus according to Embodiment 3 of the present disclosure.
Figure 11:
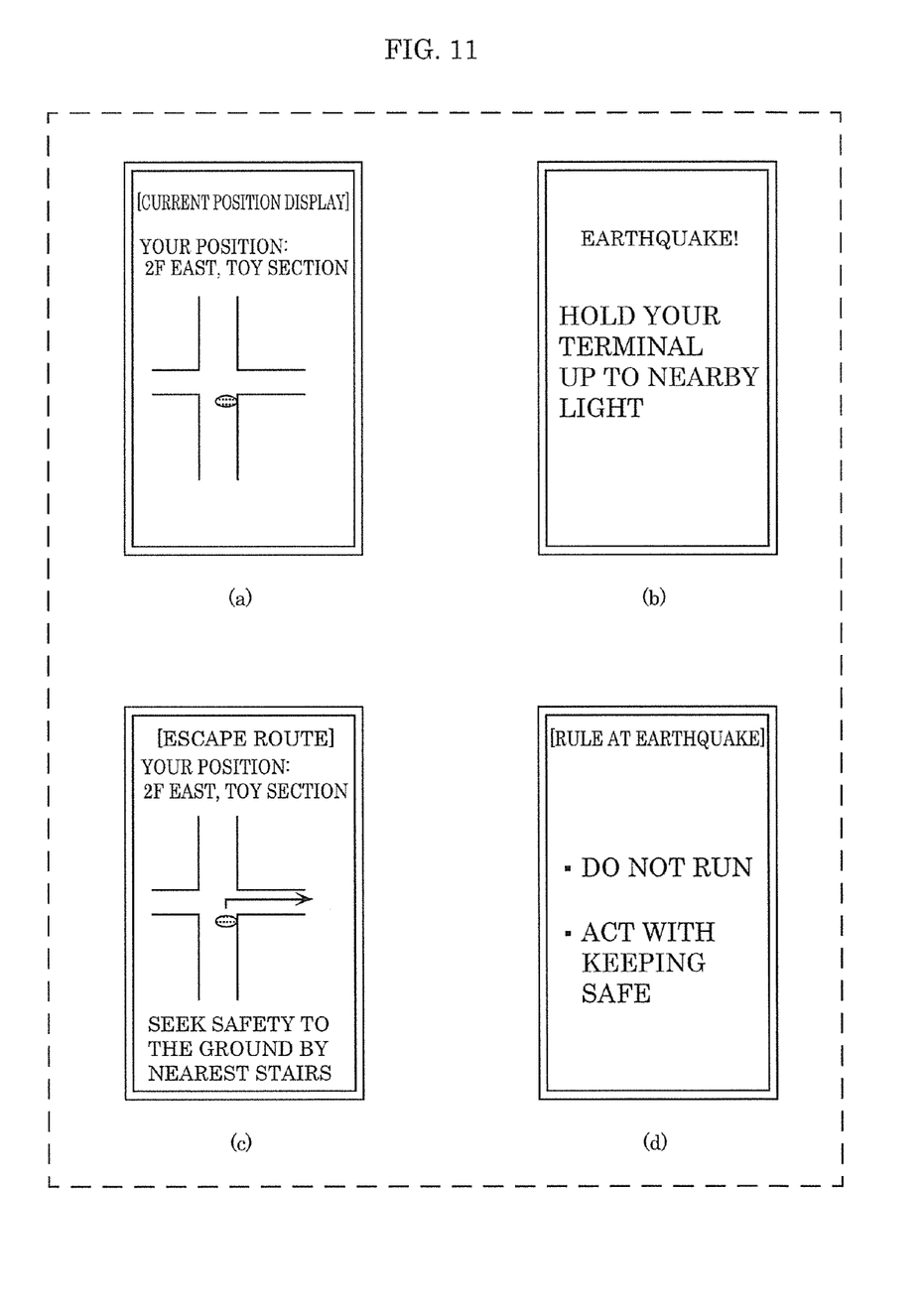
FIG. 11 is diagrams showing examples of a screen of a terminal device that has received a radio wave beacon or an optical signal from the lighting apparatus according to Embodiment 3 of the present disclosure.

FIG. 10 is a flowchart showing an operation of lighting apparatus 22 according to the present embodiment. FIG. 11 is a diagram showing examples of a screen display of terminal device 14 that has received the radio wave beacon or the optical signal from lighting apparatus 22 according to the present embodiment.

When disaster detector 60 detects disaster (S20), controller 62 causes an operation mode to change from the normal mode to the disaster mode (S21). Controller 62 then causes beacon transmitter 50 to transmit the radio wave beacon containing the identification information corresponding to the disaster (S22). This changes a screen display of terminal device 14 from a normal-mode screen display to a disaster-mode screen display. Here, the normal-mode screen display displays positioning result in the normal mode ((*a*) of FIG. 11), whereas the disaster-mode screen display displays a message that urges the relocation of terminal device 14 to a place where terminal device 14 can obtain the optical signal from optical communicator 42 ((*b*) of FIG. 11).

Controller 62 then judges a type of the disaster detected by disaster detector 60 (S23), and causes optical communicator 42 to operate in response to the determined disaster type (S24 to S29). Specifically, when the disaster detected by disaster detector 60 is a fire, controller 62 determines identification information corresponding to a fire mode (S24), and causes optical communicator 42 to transmit an optical signal containing the identification information (S25). When determining the identification information, controller 62 refers to a table in which correspondence between the disaster mode and the identification information is previously registered. When the disaster detected by disaster detector 60 is an earthquake, controller 62 determines identification information corresponding to an earthquake mode (S26), and causes optical communicator 42 to transmit an optical signal containing the identification information (S27). When the disaster detected by disaster detector 60 is a tsunami or a tidal wave, controller 62 determines identification information corresponding to a tsunami mode (S28), and causes optical communicator 42 to transmit an optical signal containing the identification information (S29).

Terminal device 14 that has received the identification information corresponding to the respective disaster modes thus performs screen display in response to the received identification information, in accordance with execution of an application. For example, terminal device 14 that has received the identification information corresponding to the fire mode specifies an escape route based on the current position that has been indicated, and displays the specified escape route on the screen ((*c*) of FIG. 11). Terminal device 14 that has received the identification information corresponding to the earthquake mode displays a manual for coping with the disaster, which has been previously prepared ((*d*) of FIG. 11). The screen display is conducted in terminal device 14 under execution of the application or using languages including Japanese, English, and so on, which have previously been set as default in terminal device 14.

Controller 62 refers to a detection state in disaster detector 60 to judge whether or not the detected disaster settles (S30). Controller 62 repeats judgment until it determines that the disaster settles (No in S30). When determining that the disaster settles (Yes in S30), controller 62 shifts the operation mode from the current disaster mode to the normal mode (S31).

Lighting apparatus 22 according to the present embodiment includes functions below, in addition to the functions according to Embodiment 1. Specifically, lighting apparatus 22 further includes optical communicator 42, disaster detector 60, and controller 62. Optical communicator 42 transmits an optical signal by demodulating light to be emitted from lighting unit 40. Disaster detector 60 detects occurrence of a disaster. Controller 62 controls the operation modes. When disaster detector 60 detects no disaster, controller 62 causes optical communicator 42 and beacon transmitter 50 to operate in an operation mode that has been previously specified as the normal mode. In contrast, when disaster detector 60 detects a disaster, controller 62 causes optical communicator 42 and beacon transmitter 50 to operate in an operation mode that has been previously specified as the disaster mode. This achieves the positioning system that supports two operation modes including the normal mode and the disaster mode.

Beacon transmitter 50 transmits a radio wave beacon. Controller 62, in the disaster mode, causes beacon transmitter 50 to include, in the radio wave beacon, identification information corresponding to the disaster and to perform a push communication to a terminal device located within reach of the radio wave beacon. Accordingly, the push communication is performed to a terminal device using the radio wave beacon at the occurrence of the disaster, thereby notifying the terminal device of the occurrence of the disaster.

The identification information corresponding to the disaster is used for allowing terminal device 14 to display a message that urges the relocation of terminal device 14 to a place where terminal device 14 can receive an optical signal from optical communicator 42. Accordingly, at the disaster, the message that urges the relocation of terminal device 14 to the place where the optical signal from optical communicator 42 is obtainable is displayed on a screen of terminal device 14 that has received the radio wave beacon.

In the disaster mode, controller 62 causes optical communicator 42 to include, in an optical signal, identification information corresponding to a type of the disaster detected by disaster detector 60, and to transmit the identification information to terminal device 14. This allows an image or a message according to the type of the disaster to be displayed on a screen of terminal device 14 that has received the identification information corresponding to the type of the disaster. Accordingly, sufferers are appropriately guided at the disaster.

In the disaster mode, controller 62 causes optical communicator 42 to include, in an optical signal, identification information for allowing terminal device 14 to display thereon a manual for coping with a disaster, and to transmit the optical signal to terminal device 14. Accordingly, the manual for coping with the disaster is displayed on the screen of terminal device 14 that has received the identification information, when a disaster occurs. Sufferers thus can receive an appropriate instruction at a disaster.

Although the lighting apparatus and the positioning system according to the present disclosure have been described based on Embodiments 1 to 3 and modifications, the present disclosure is not limited to the foregoing embodiments and modifications. Forms obtained by various modifications to the exemplary embodiments that can be conceived by a person of skill in the art as well as forms realized by combining structural components in different exemplary embodiments, which are within the scope of the essence of the present disclosure may be included in one or more aspects.

Although beacon transmitter 50 transmits a beacon using a radio wave, i.e., a radio wave beacon, in aforementioned Embodiment 1 to 3, beacon transmitter 50 may transmit the beacon on an optical signal, i.e., an optical beacon. For the occasion, one of a long-distance beacon and a short-distance beacon may be the radio wave beacon and the other may be the optical beacon.

Although optical communicator 42 transmits an optical signal for the visible light communication that uses light emitted from lighting unit 40, optical communicator 42 may transmit an optical signal using infrared light or ultraviolet light.

Embodiments 2 and 3 include all functions of Embodiment 1, but may not necessarily include all functions of Embodiment 1 as long as an effect obtained by respective Embodiments 1 and 2 can be obtained. For example, in Embodiments 2 and 3, the beacon transmitter may not necessarily transmit the long-distance beacon and the short-distance beacon, but may transmit a single type of beacon. With such a configuration, the safety check in Embodiment 2 and the operation at the disaster mode in Embodiment 3 can also be achieved.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting apparatus for use in a positioning system comprising:
 a power supplier that supplies power;
 a lighting unit that is lit by the power supplied by the power supplier; and
 a beacon transmitter that operates by the power supplied by the power supplier, and transmits a beacon which is a signal for positioning,
  wherein the beacon includes a long-distance beacon transmitted with first transmission power and a short-distance beacon transmitted with second transmission power less than the first transmission power, and
  the beacon transmitter transmits at least the long-distance beacon less frequently than the short-distance beacon,
 the lighting apparatus further comprising:
 an optical communicator that transmits an optical signal by modulating light to be emitted from the lighting unit;
 a detector that detects occurrence of a predetermined event; and a controller that causes the optical communicator and the beacon transmitter to operate (i) in an operation mode previously determined as a normal mode, when the detector detects no predetermined event, and (ii) in an operation mode previously determined as a disaster mode, when the detector detects the predetermined event, wherein the beacon transmitter transmits a radio wave beacon, the controller causes, in the disaster mode, the beacon transmitter to include identification information in the radio wave beacon, and to perform a push communication to a terminal device located within reach of the radio wave beacon, the identification information corresponding to the predetermined event, and wherein the identification information corresponding to the predetermined event is identification information for allowing the terminal device to display a message that indicates a location to move the terminal device to, wherein the optical signal from the optical communicator is obtainable at the location.

2. The lighting apparatus according to claim 1, wherein the beacon transmitter transmits the long-distance beacon and the short-distance beacon using radio waves.

3. The lighting apparatus according to claim 1, wherein the beacon transmitter transmits an optical signal using one of visible light, ultraviolet light, and infrared light, when transmitting the short-distance beacon.

4. The lighting apparatus according to claim 1, wherein the beacon transmitter transmits the long-distance beacon in synchronization with a timing at which another lighting apparatus in the positioning system transmits another long-distance beacon.

5. The lighting apparatus according to claim 1, wherein the beacon transmitter transmits the long-distance beacon at a timing different from the timing at which the another lighting apparatus transmits the another long-distance beacon.

6. The lighting apparatus according to claim 1, wherein the power supplier includes a storage battery;

the lighting unit is lit by power supplied by the storage battery; and the beacon transmitter obtains, from a terminal device, information held in the terminal device, and transfers the obtained information to a beacon transmitter included in another lighting apparatus in the positioning system.

7. The lighting apparatus according to claim 6, wherein the optical communicator transmits maintenance information using the optical signal, the maintenance information indicating at least one of a lighting state of the lighting unit, a charging level of the storage battery, and a state of the beacon transmitter.

8. The lighting apparatus according to claim 7, wherein the optical communicator transmits the maintenance information using the optical signal, when detecting an instruction from an outside source.

9. The lighting apparatus according to claim 1, wherein the controller causes, in the disaster mode, the optical communicator to include identification information in the optical signal, and to transmit the optical signal to the terminal device, the identification information corresponding to a type of the predetermined event detected by the detector.

10. The lighting apparatus according to claim 1, wherein the controller causes, in the disaster mode, the optical communicator to include identification information in the optical signal, and to transmit the optical signal to the terminal device, the identification information being used for allowing the terminal device to display a manual.

11. A positioning system comprising:

the lighting apparatus according to claim 1; and a terminal device that receives a beacon transmitted from the lighting apparatus, and performs positioning using the received beacon.

\* \* \* \* \*